United States Patent
Hill et al.

(10) Patent No.: US 10,813,802 B2
(45) Date of Patent: Oct. 27, 2020

(54) RAMP ASSEMBLY FOR MOTORIZED VEHICLE

(71) Applicant: The Braun Corporation, Winamac, IN (US)

(72) Inventors: Anthony S. Hill, Brookston, IN (US); Robert E. Bettcher, III, Winamac, IN (US)

(73) Assignee: THE BRAUN CORPORATION, Winamac, IN (US)

( * ) Notice: Subject to any disclaimer, the term of this patent is extended or adjusted under 35 U.S.C. 154(b) by 109 days.

(21) Appl. No.: 16/153,947

(22) Filed: Oct. 8, 2018

(65) Prior Publication Data

US 2019/0106042 A1 Apr. 11, 2019

Related U.S. Application Data

(60) Provisional application No. 62/569,671, filed on Oct. 9, 2017.

(51) Int. Cl.
*A61G 3/06* (2006.01)
*B60P 1/43* (2006.01)

(52) U.S. Cl.
CPC .............. *A61G 3/067* (2016.11); *A61G 3/061* (2013.01); *B60P 1/431* (2013.01)

(58) Field of Classification Search
CPC .. B60P 1/43; B60P 1/431; B60P 1/433; A61G 3/06; A61G 3/061; A61G 3/067; B65G 69/2847
USPC .......................................... 414/522, 537, 921
See application file for complete search history.

(56) References Cited

U.S. PATENT DOCUMENTS

| | | | | |
|---|---|---|---|---|
| 4,850,788 A | * | 7/1989 | Dickson | B60P 1/431 414/537 |
| 5,253,410 A | | 10/1993 | Mortenson | |
| 5,257,894 A | * | 11/1993 | Grant | B60P 1/431 414/537 |

(Continued)

FOREIGN PATENT DOCUMENTS

| | | |
|---|---|---|
| EP | 1296628 B1 | 6/2005 |
| FR | 2097665 A1 | 5/2014 |

(Continued)

OTHER PUBLICATIONS

International Search Report & Written Opinion, Korean Intellectual Property Office, dated Jan. 31, 2019, 13 pages.

*Primary Examiner* — Glenn F Myers
(74) *Attorney, Agent, or Firm* — Taft Stettinius & Hollister LLP; Stephen F. Rost

(57) ABSTRACT

A ramp assembly for a passenger using a wheelchair to enter or exit a motorized vehicle. The ramp assembly includes a rail assembly having a track with a first portion extending longitudinally along the rail and a second portion inclined with the first portion. A ramp is operatively connected to the rail assembly. The ramp includes a first body and a second body that articulates with respect to the first body, wherein the ramp moves along the rail assembly and includes a storage position and a deployed position. A first roller is operatively connected to the first body and a second roller is operatively connected to the second body. The first body and the second body of the ramp are generally planar in the storage position and the first body is inclined with respect to the second body in the deployed position.

19 Claims, 12 Drawing Sheets

(56) References Cited

U.S. PATENT DOCUMENTS

| | | | |
|---|---|---|---|
| 5,343,583 A | | 9/1994 | Cook |
| 5,636,399 A | * | 6/1997 | Tremblay ............... A61G 3/061 14/71.1 |
| 5,832,555 A | | 11/1998 | Saucier et al. |
| 6,442,783 B1 | | 9/2002 | Yoon et al. |
| 7,908,695 B2 | | 3/2011 | Budd et al. |
| 8,926,254 B2 | | 1/2015 | Pocobello et al. |
| 2003/0210976 A1 | | 11/2003 | Koretsky |
| 2006/0245883 A1 | * | 11/2006 | Fontaine ............... A61G 3/061 414/537 |
| 2011/0027054 A1 | | 2/2011 | Hansen |

FOREIGN PATENT DOCUMENTS

| | | |
|---|---|---|
| JP | 10-315840 A | 12/1998 |
| WO | 2010003387 A1 | 1/2010 |

\* cited by examiner

RAMP ASSEMBLY FOR MOTORIZED VEHICLE

CROSS-REFERENCE TO RELATED APPLICATIONS

This application claims priority to U.S. Provisional Patent Application Ser. No. 62/569,671, filed Oct. 9, 2017, having the title "Ramp Assembly for Motorized Vehicle", the disclosure of which is incorporated herein by reference in its entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van or bus is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a floor of an original equipment manufacturer (OEM) vehicle is lowered or otherwise modified to accommodate an entry and exit of the physically limited individual through a side door or entrance of the vehicle. Once inside the vehicle, individual who uses the assisted entrance is located in a rear passenger compartment of the vehicle adjacent to or behind the side entrance.

SUMMARY

In one embodiment, there is provided a ramp assembly for passengers using a wheel chair, walker or other means of mobility assistance to enter or exit a motorized vehicle. The ramp assembly includes a rail assembly having a track with a first portion extending longitudinally along the rail assembly and includes a first body and a second body that articulates with respect to the first body, wherein the ramp moves along the rail assembly and includes a storage position and a deployed position. A first roller is operatively connected to the first body. A second roller is operatively connected to the second body, wherein the first body and the second body of the ramp are generally planar in the storage position and the first body is inclined with respect to the second body in the deployed position.

In another embodiment, there is provided a motor vehicle having a body, a floor, and a ramp assembly disposed adjacently to the floor. The ramp assembly includes a rail assembly having a track with a first portion extending longitudinally along the rail and a second portion inclined with the first portion. A ramp is operatively connected to the rail assembly and includes a first body and a second body that articulates with respect to the first body, wherein the ramp moves along the rail assembly and includes a storage position and a deployed position. A first roller is operatively connected to the first body, and a second roller is operatively connected to the second body, wherein the first body and the second body of the ramp are generally planar in the storage position and the first body is inclined with respect to the second body in the deployed position.

In an additional embodiment, there is provided a method of extending and retracting a mobility assistance ramp from a vehicle including a floor member configured to support a passenger in a wheelchair, walker or other means of mobility assistance. The method includes: providing a ramp operatively connected to a rail assembly, the ramp having a first body and a second body that articulates with respect to the first body; moving the ramp along the rail assembly from a storage position to a deployed position; and during movement of the ramp from the storage position to the deployed position, moving the first body along a first track and a second track inclined with respect to the first track, and moving the second body along the first track, wherein the first body is inclined with respect to the second body at the deployed position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
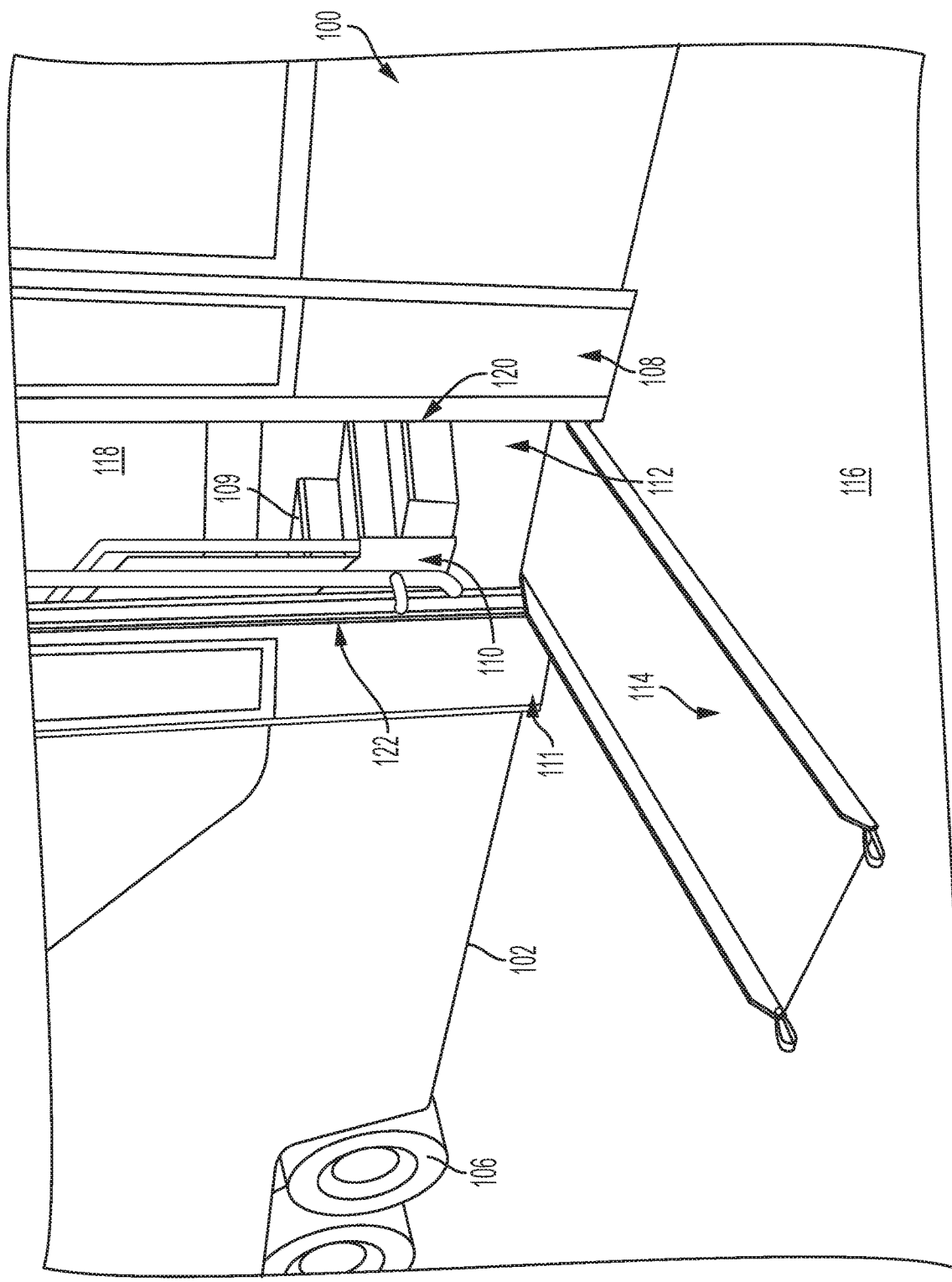
FIG. 1 is an elevational side view of a passenger vehicle including an access ramp.

FIG. 1 illustrates a vehicle 100, commonly identified as a passenger van or bus, available from any number of United States and foreign manufacturers. The vehicle may be a tour bus, a double-decker bus, or any other type of vehicle. The principles and teachings of the present disclosure may be used for any type of vehicle.

In the illustrated embodiment of FIG. 1, the vehicle 100 includes a body on frame construction, but other vehicles having a unibody construction are also included in the present disclosure. Consequently, the use of vehicle herein includes all types and kinds of vehicles with a body on frame construction, a unibody construction, or other constructions. In addition, while the motor coach 100 is illustrated in FIG. 1, the present disclosure is directed to all passenger vehicles carrying one or more passengers, including vans.

The vehicle 100 includes a body 102 operatively coupled to front wheels (not shown) and rear wheels 106. The vehicle 100 includes a frame one body construction. A first passenger side door 108 is located between the front wheels and rear wheels 106 and provides access for one or more passengers for being transported by the vehicle 100. The vehicle includes a set of stairs 109 for certain passengers and a ramp 110 for passengers using a wheelchair or other mobility assisting device.

The vehicle 100 includes a second passenger side door 111 which when opened with the first side door 108 provides an opening 112. The side doors 108 and 111 may be modified to slide along one or more tracks to increase the size of an opening 112 to the interior of the vehicle. The widened opening 112 provides access to a passenger seated in a wheelchair or using another form of mobility assistance. The opening 112 is defined on the sides thereof by an edge 120 of the door 108 and the edge 122 of the door 111. The vehicle is further modified to include a ramp assembly 114 which provides rolling access for a wheelchair to move from a ground surface 116 into an interior 118 of the vehicle 100. The ramp assembly 114 is installed at the opening 112 and is movable between the interior of the vehicle, where it is stored in some embodiments, and to the exterior for wheelchair access. The ramp assembly 114 is not limited to passengers using a wheelchair, but walking passengers also using the ramp, especially those who find steps difficult.

Figure 2:
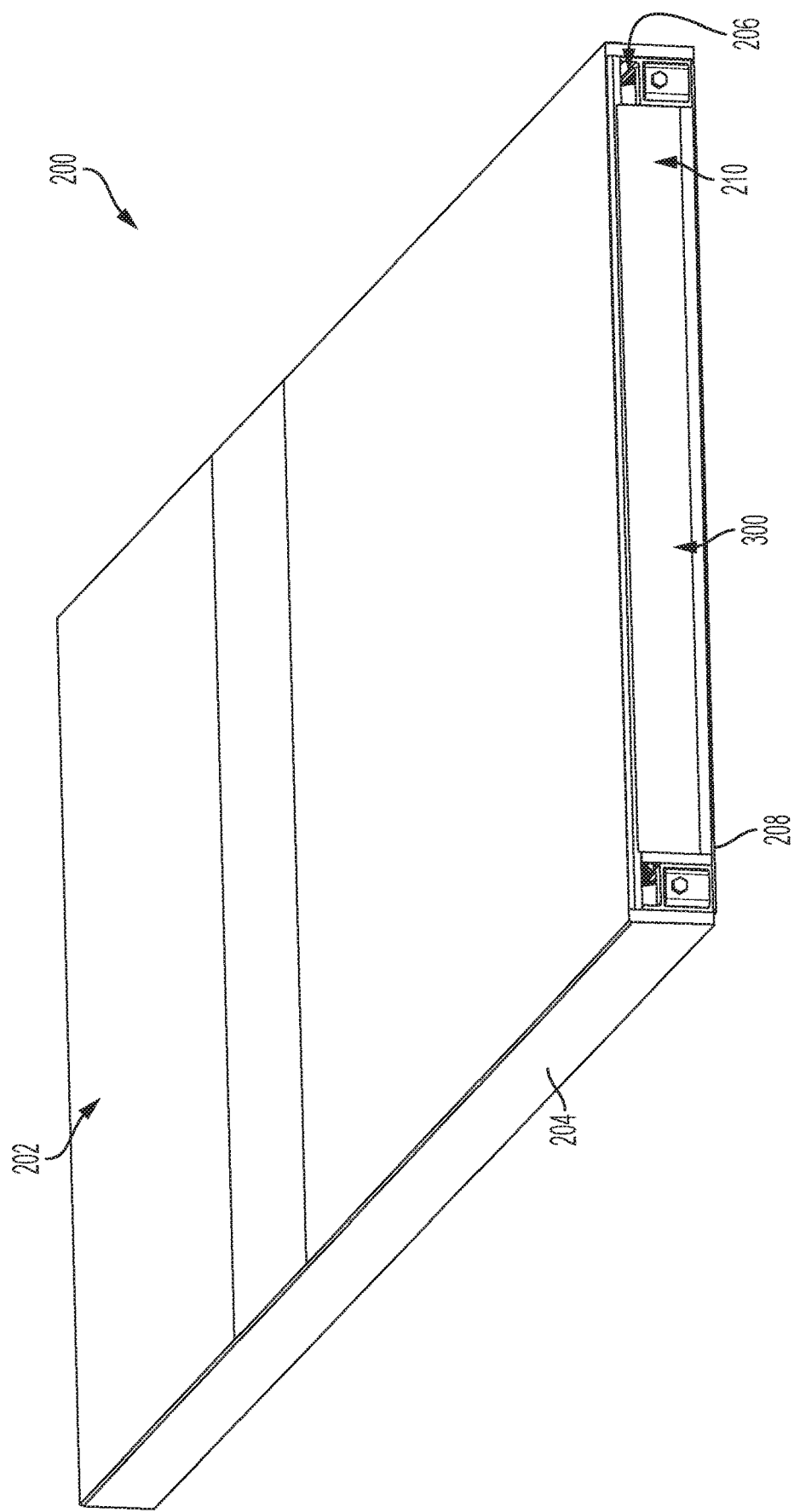
FIG. 2 is a perspective view of one embodiment of a ramp assembly in a stowed position.

In FIG. 2, a ramp assembly 200 is shown which may be incorporated into the motor coach of FIG. 1, or a passenger vehicle such as a bus, a van or other motorized vehicle. As shown, the ramp assembly housing may be partly formed by a floor member 202 of the vehicle. The floor member 202 may be a vehicle floor, for instance. In some cases, the vehicle floor of an OEM vehicle may be modified to better facilitate a ramp assembly such as the one described and shown in this disclosure. The vehicle floor may be lowered to improve the ease with which a passenger in a wheelchair may ingress or egress the vehicle. In any event, a portion of the vehicle floor member 202 is shown in FIG. 2.

Figure 3:
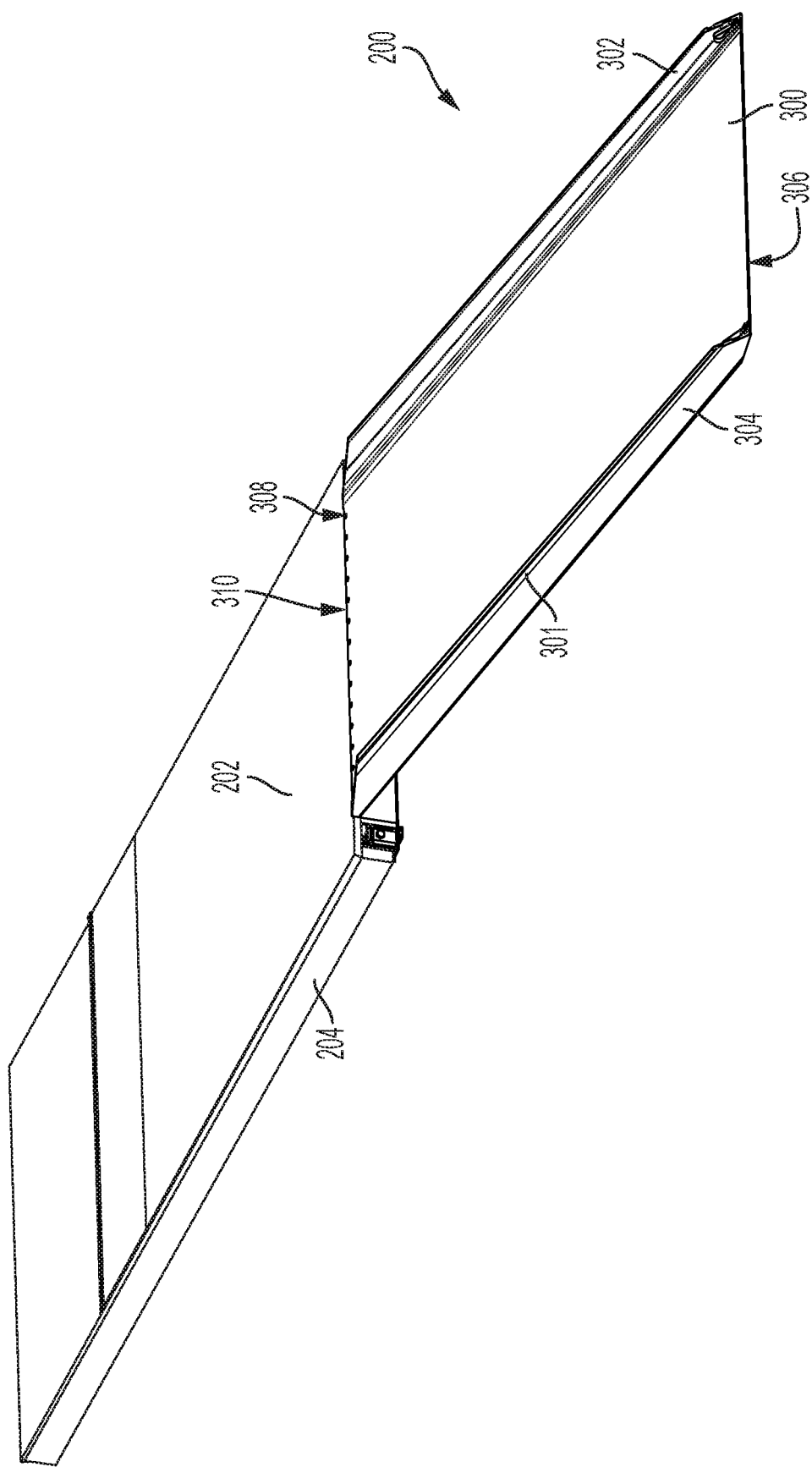
FIG. 3 is a perspective view of the ramp assembly of FIG. 2 in a deployed position.

In addition, the ramp assembly 200 is shown as a cassette-like configuration. Here, the floor member 202 forms the top wall or upper portion, and a bottom member 208 forms the bottom wall or lower portion thereof of the cassette-like configuration or unit. In one embodiment, the top wall is co-planer with the vehicle floor. In addition, a first side member 204 and a second side member 206 may be disposed on either side. Both side members, the floor member 202, and the bottom member 208 form a cassette-like opening 210 through which a ramp 300 (FIG. 3) may travel. In FIG. 2, for example, the ramp 300 is shown in its stowed position. In FIG. 3, however, the ramp 300 is shown in its deployed or lowered position.

As shown in FIG. 3, the ramp 300 may include a pair of side rails located on either side of a platform 301 generally defining a horizontal plane. For instance, the ramp 300 may include a first side rail 302 and a second side rail 304, where both side rails are on opposite sides of the ramp 300. Each side rail may extend upward by a defined distance. This distance may be approximately 2 or more inches. This difference, however, may differ based on the type of embodiment of ramp.

Figure 4:
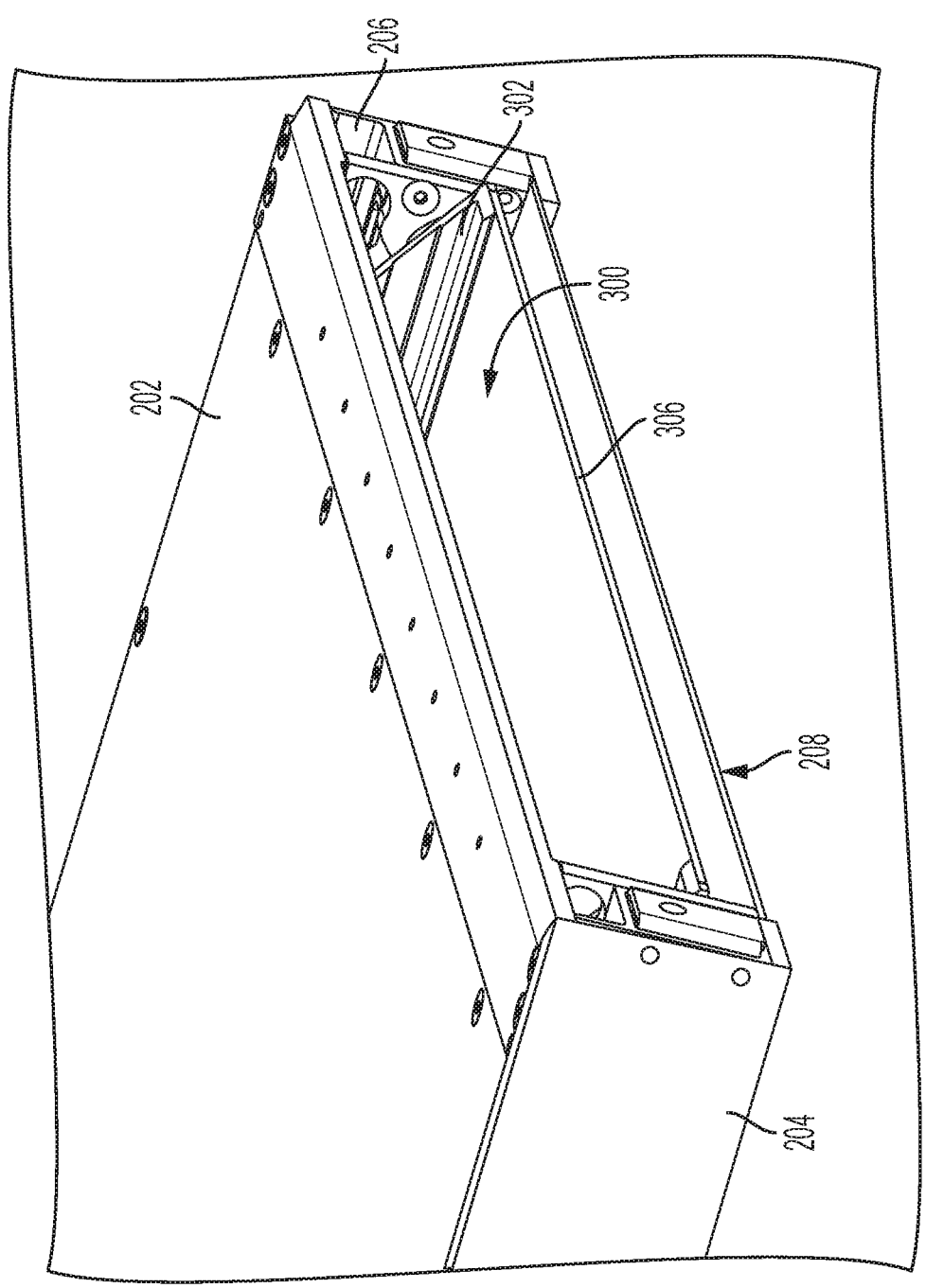
FIG. 4 is an enhanced perspective view of an opening through which the ramp assembly of FIG. 2 travels when moving between the stowed and deployed positions.

The ramp 300 includes a leading edge 306 and a trailing edge 308. The leading edge 306 may first move through the opening 210 as the ramp 300 is moved from its stowed position (see FIG. 4) to its deployed position (see FIG. 5). The leading edge 306 may pivot or be angled with respect to the floor member 202 into the deployed position such that the leading edge 306 may contact a ground surface.

Figure 5:
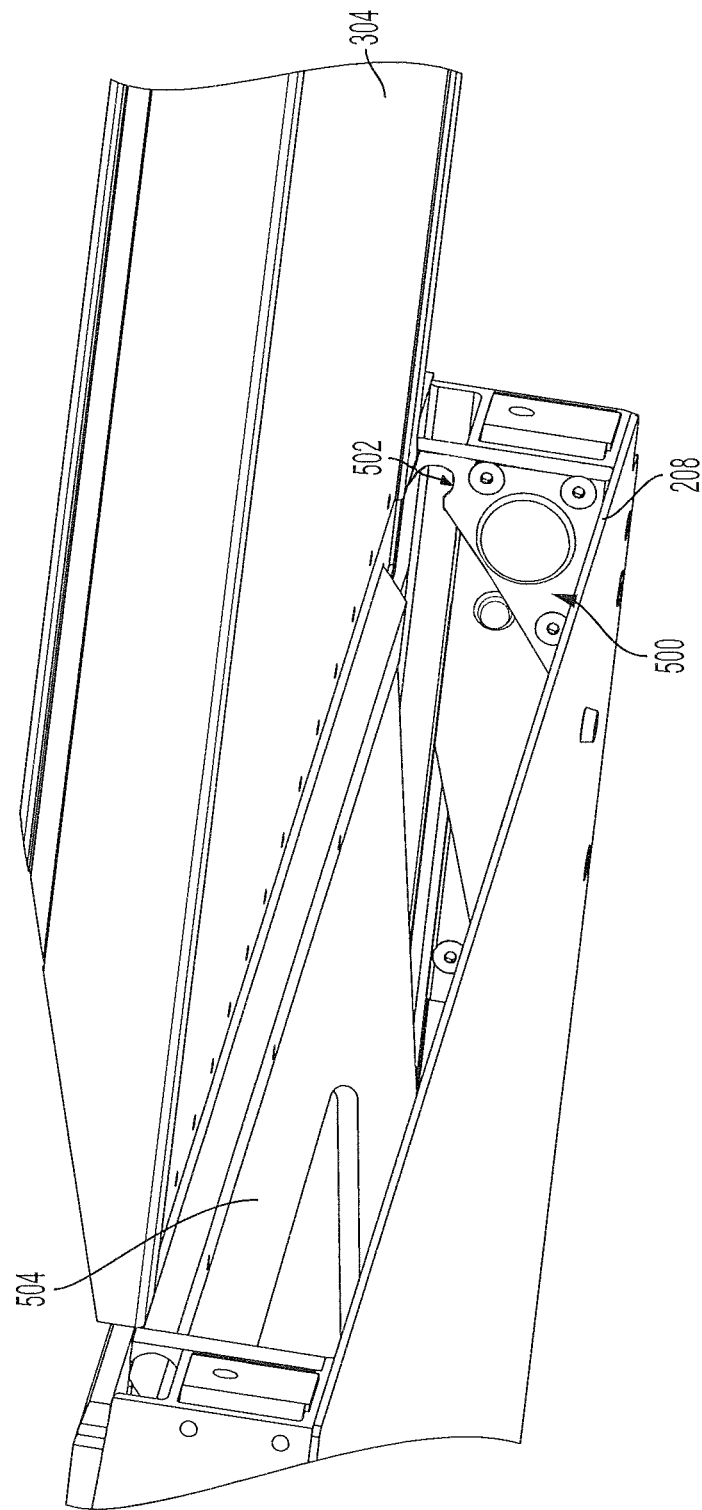
FIG. 5 is a perspective view of an internal guide ramp of the ramp assembly of FIG. 2.

The trailing edge 308 is shown being approximately flush with an edge 310 of the floor member 202. To reach this raised, flush position, the trailing edge 308 of the ramp 300 is raised as the ramp 300 is moved to its deployed position. To do so, the ramp 300 may be coupled to an assembly 504 as partially shown in FIG. 5. The carriage assembly 504 may include a plurality of rollers as described herein. In one embodiment, the rollers travel along tracks, which will be described below, as the ramp 300 travels between the stowed and deployed positions. As the ramp 300 is moving towards its deployed position of FIG. 3, one or more of the plurality of rollers may come into contact with a guide ramp 500 of the ramp assembly 200. The guide ramp 500, as shown in FIG. 5, may be angled such that the one or more rollers travel along the angled portion of the guide ramp 500. The guide ramp 500 defines a track. In FIG. 5, the one or more rollers may travel upward along the guide ramp 500 until the one or more rollers is disposed in a recess 502 shown at an approximate end of travel of the guide ramp 500. The angled portion of the guide ramp is incline with respect to the 654

As the one or more rollers moves along the guide ramp 500, the trailing edge 308 of the ramp 300 moves in a generally upward direction until the one or more rollers is disposed in the recess 502. At this point, the trailing edge 308 of the ramp 300 may be positioned at its raised position and approximately flush with the floor member 202. A wheelchair, for example, may be rolled between the floor member 202 and the ramp 300 freely as the trailing edge 308 abuts with the edge 310 of the floor member 202.

Figure 6:
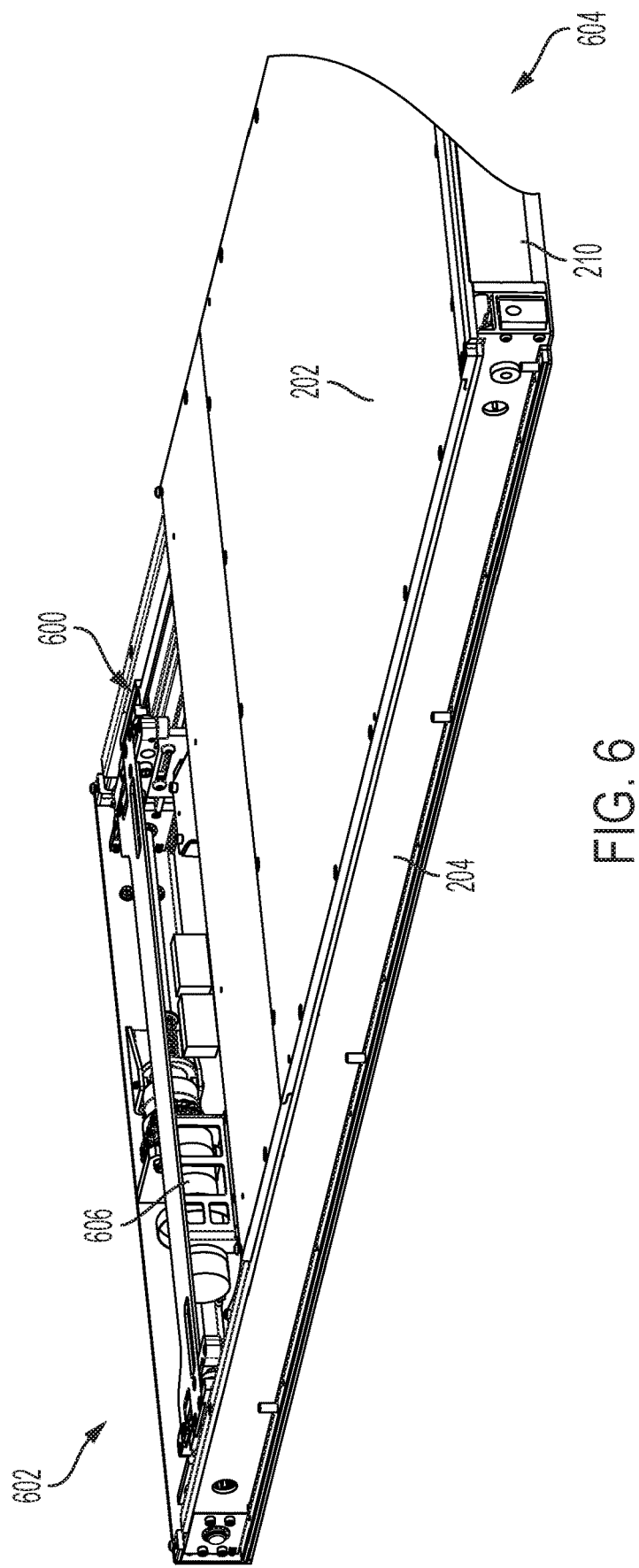
FIG. 6 is a top perspective view of the ramp assembly of FIG. 2 and a ramp drive system.
Figure 7:
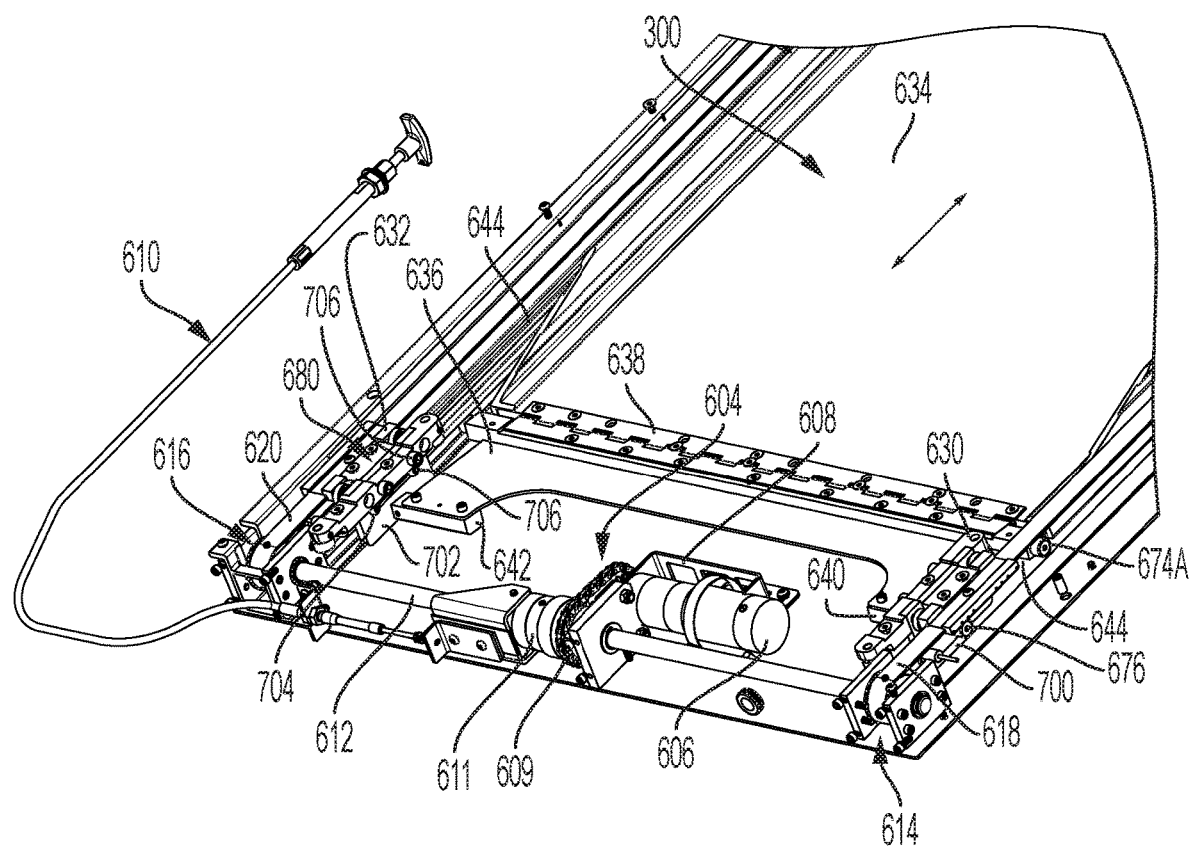
FIG. 7 is a top perspective view of a different orientation for the ramp drive system of FIG. 6.

The manner in which the ramp 300 is controlled is partly shown in FIGS. 6 and 7. In FIG. 6, the location of a drive system 600 relative to the ramp 300 and cassette opening 210 is shown. Here, the drive system 600 is located toward the street side end 602 of the vehicle, whereas the cassette opening 210 is located toward the curbside end 604. The access end 604 may simply be referred to as the side or location of the vehicle where the ramp 300 may be deployed to allow a mobility challenged passenger to enter or exit the vehicle. The non-access end 602 may include a door or compartment where a technician or mechanic may access the drive system 600 to perform maintenance or repairs. The ramp 300 may be stowed such that it is oriented and moves between its different positions in a direction that is substantially transverse to the overall length of the vehicle.

Although not shown, or necessary for the ramp to be utilized manually for mobility assistance an electronic control system including a logic based controller such as a computer or other form of programmable electronic device may be provided for automatically controlling the ramp 300 between its different positions. For instance, the controller may control the ramp drive system 600 as shown. The drive system 600 may include a motor 606 sized for operably driving the ramp 300. The motor 606 may be mounted to a motor housing 608 as shown in FIG. 7. The motor 606 includes a motor shaft (not shown) which may be operably coupled to a drive system 604. In one embodiment, the drive system 604 includes a driving sprocket rotated by the motor 606. A driven sprocket is driven by a chain 609 extending between the driving sprocket and the driven sprocket.

While FIG. 7 illustrates the drive system 600 to include a chain and sprockets, in other embodiments it is to be understood that a pair of engaging gears are employed. Moreover, a pair of pulleys with a chain, belt or cables may also be used in another embodiment. In any event, the motor 606 transmits power to a drive element such as the chain drive 604, which operably transfers the power to the driven element (i.e., driven sprocket). The driven sprocket is coupled to a drive shaft 612.

The drive shaft 612 may be an elongated shaft as shown in FIG. 7. The drive shaft 612 may have a first end and a second end. The first end of the drive shaft 612 may be operably coupled to a first drive cog 614, and the second end thereof may be operably coupled to a second drive cog 616. The first and second drive cogs may be part of a drive belt system used to move the carriage assembly 504 and ramp 300 between the stowed and deployed positions. A manual release handle 610 is coupled to a shaft disconnect assembly 611 which engages and disengages the shaft 612 from one or both of the first and second drive pulleys 614 and 616. The manual release handle 610 enables an individual to manually move the ramp 300 to the deployed position and to return the ramp 300 to the retracted position if needed for instance should the vehicle electrical system not function.

Figure 10:
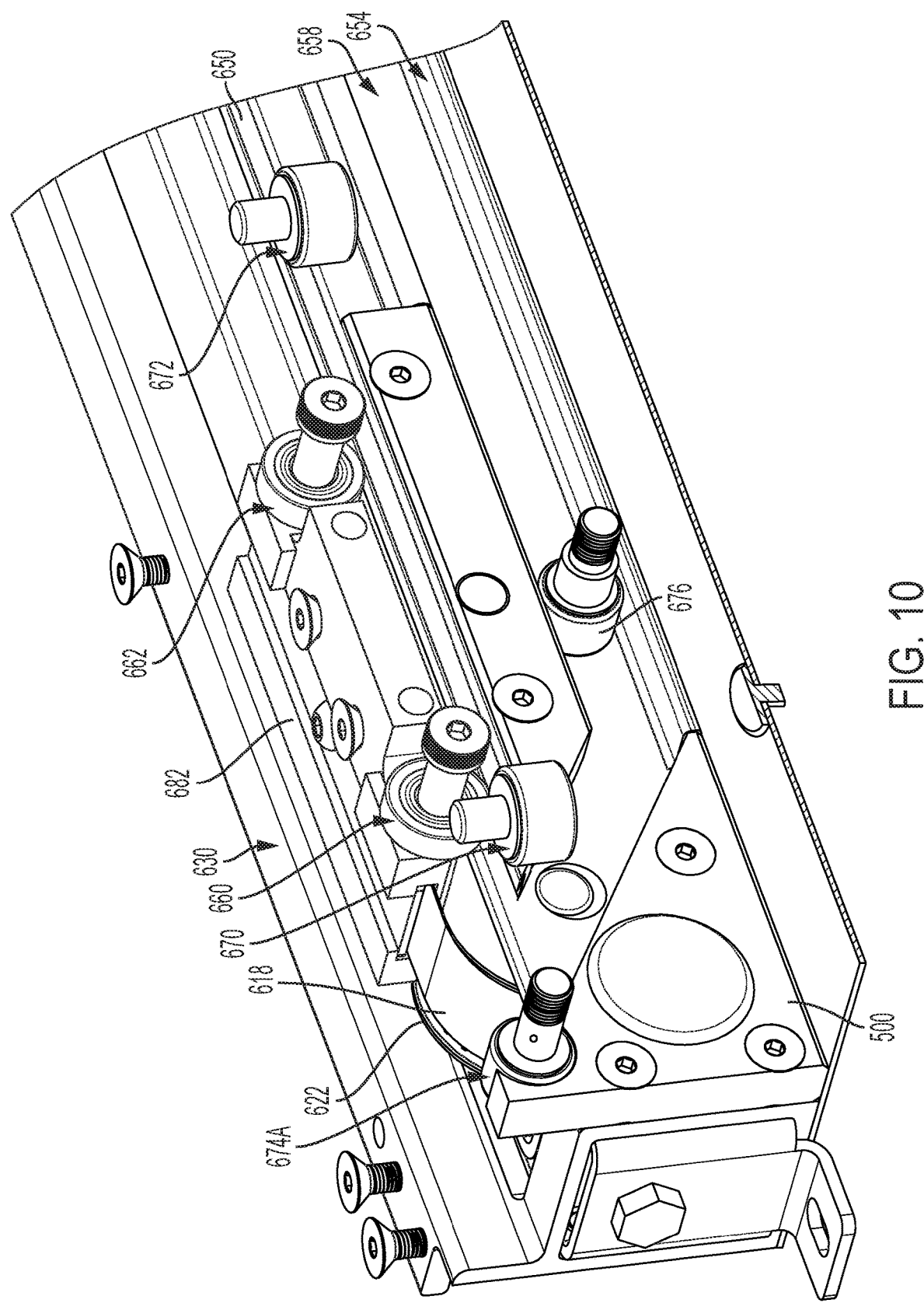
FIG. 10 is a view of the track assembly of FIG. 8 with certain components removed.

A first drive belt 618 is operably driven by the first drive cog 614, and a second drive belt 620 is operably driven by the second drive cog 616. The drive belts may each extend from the respective drive cog to an opposite cog, gear or pulley. A driven cog 622 operatively connected to the drive belt 618 is shown in FIG. 10. The drive belt system may be encompassed in each of the first side member 204 and the second side member 206. Additional drive cogs or pulleys are located at the other ends of the continuous belt to provide for movement of the ramp. One or more of the drive cogs are coupled to a tensioner bracket to maintain the belt in a predetermined tension and position.

In another embodiment, the drive system 600 includes a drive clutch mechanism which is used in place of the disconnect assembly 611. In one embodiment of the drive clutch mechanism, a slider puck mechanism is used to allow for disengagement of the drive motor 606 from the drive shaft 612. In doing so, this allows for ease of movement via manual actuation of the ramp 300 in case or an emergency or loss of electrical power. In other words, the clutch mechanism may disconnect the motor 606 from the drive shaft 612 to allow a user to manipulate the ramp 300 between its stowed and deployed positions. By disconnecting the motor 606 at this location in the driveline, positional accuracy can be maintained without a need for any corrective action once electrical power is restored.

The carriage assembly includes a first track roller assembly 630 located on side of the cassette 200 and a second track roller assembly 632 located on another side of the cassette 200. The track roller assembly 630 and the track roller assembly 632 are similarly configured and the description of one is applicable to describe the other. Each of the track roller assemblies 630 and 632 are operatively connected to the ramp 300 to move the ramp from the stowed position to the deployed position and from the deployed position to the stowed position.

The ramp 300 includes a first body 634 operatively connect to a second body 636 by an articulating connector 638, such as a hinge. Other types of articulating connectors are contemplated including a living hinge or connectors made of flexible material. The connector 638 enables the second body 636 to articulate or change its angle with respect to the first body 634. A first connector 640 is coupled to one side of the second body 636, and a second connector 642 is coupled to another side of the second body 636. Each of the first connector 640 and the second connector 642 are rotatably and respectively coupled to the track roller assembly 630 and to the track assembly 632. As the track roller assemblies move along a guiderail 644 located on either side of the ramp 300, the track assemblies follow bearing tracks defined therein.

Figure 8:
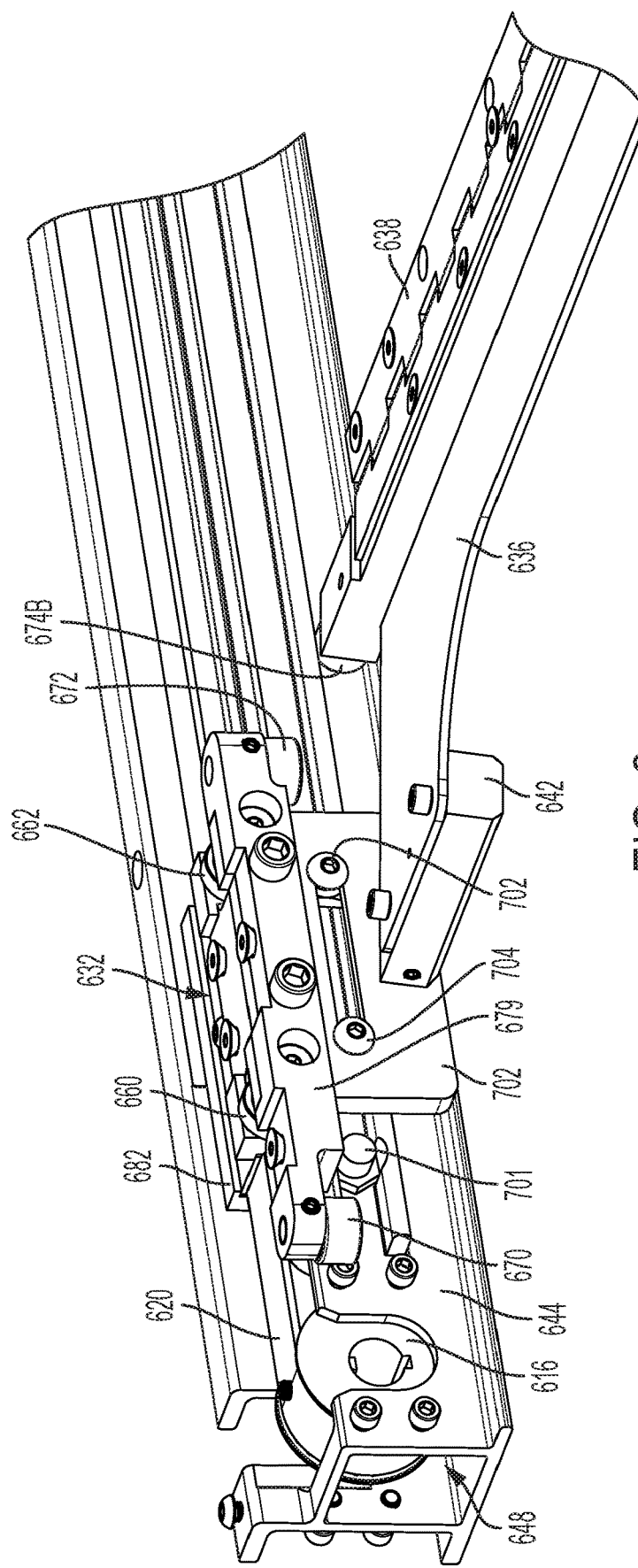
FIG. 8 is a perspective view of a track assembly.

A portion of the drive system 600 is further illustrated in FIG. 8 where the drive shaft 612 has been removed. As the drive shaft 612 rotates, the drive cog 616 rotates which moves the belt 620. The track roller assembly 632 is fixedly coupled to the drive belt 620. As the belt 620 is driven by the drive shaft 612, the track roller assembly 632 moves the ramp 300 longitudinally in either direction along the bottom member 208, since the second portion 636 is operatively connected to the track assembly 632.

The drive belts may induce movement of the carriage assembly 504 such that the plurality of rollers move along tracks defined in the respective side member. In FIG. 8, for example, one embodiment of the track assembly 632 is shown. The track roller assembly 632, in different embodiments, is formed of any desirable material including steel, aluminum, other metal or composite and the elements of the embodiments are not limited to rolling movements, but sliding as well. The track assembly 632 moves along the guiderail 644, which in one embodiment is an extruded body that forms a drive belt conduit 646 through which the drive belt is disposed. The guiderail 644 may further include an opening 648 through which the drive shaft 612 or fasteners may be disposed for coupling to a pulley, gear or other torque transmitting device.

Figure 9:
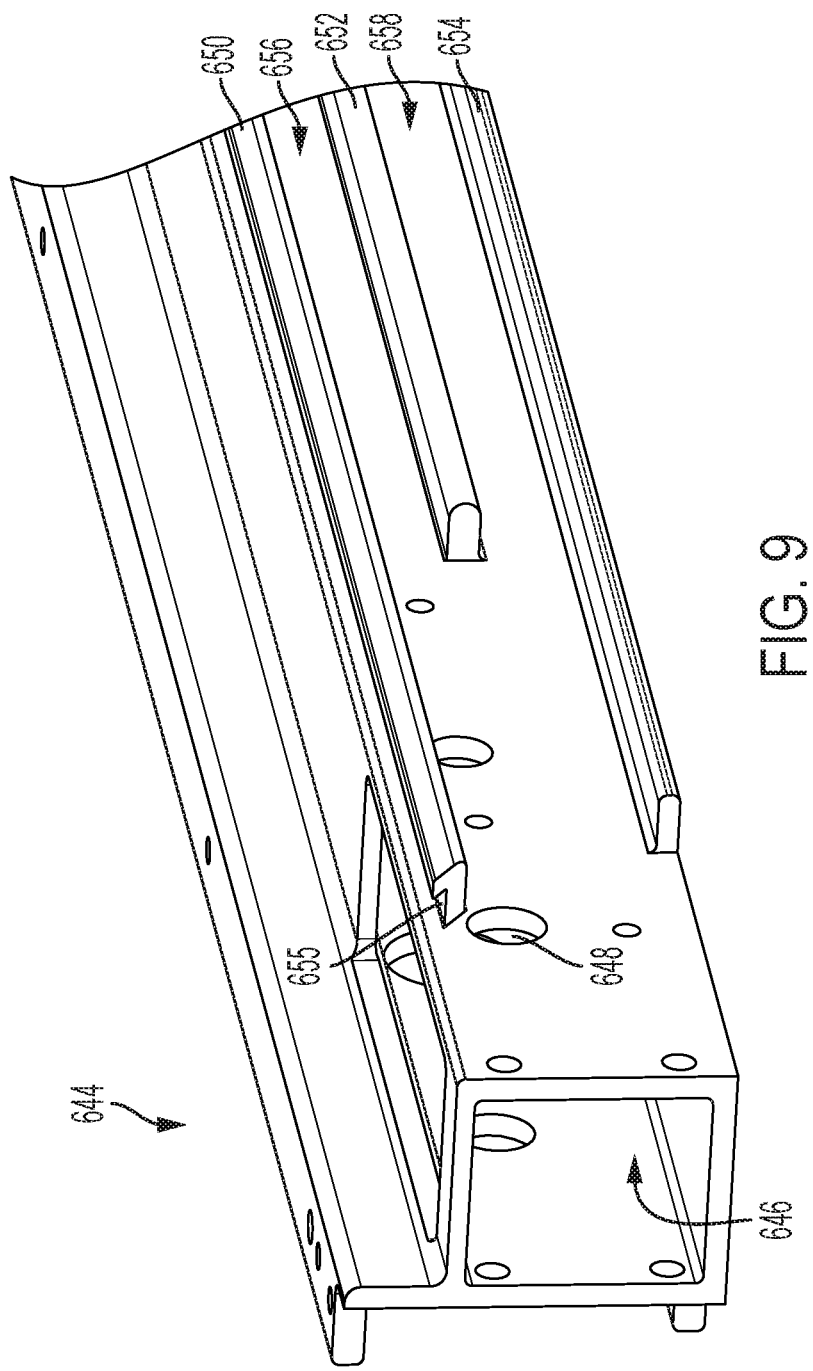
FIG. 9 is a perspective view of a rail of a track assembly.

The guide rail 644, in one or more embodiments, includes a plurality of ribs. For instance, in FIG. 9, a first rib 650, a second rib 652, and a third rib 654 are shown. In other embodiments, there may be fewer or more ribs. A first track 655 is defined between the rib 650 and a side of the guiderail 644. A second track 656 is defined between the first rib 650 and the second rib 652. Moreover, a third track 658 is defined between the second rib 652 and the third rib 654. In one embodiment, the third rib 654 defines a generally horizontal surface to support rollers 674 and 676. During operation, the track assembly moves along the tracks and is controlled in such a way to achieve both linear accuracy and movement. The track assembly 632 rides or travels along the two integrated tracks formed between ribs or extrusions in the guiderail 644 using one or more of the plurality of rollers or roller bearings and cam follower bearings or sliding elements. The different rollers or bearings may provide simultaneous linear and rotational movements so that the ramp 300 can move in and out and tilt downward to the ground level while the trailing edge of the ramp is raised up to the floor member 202 or deck level at approximately the same time.

The track assemblies 630 and 632 each include a plurality of roller bearings illustrated in FIGS. 8 and 10. The track roller assembly 632 illustrated in FIG. 10 is shown located toward the cassette opening 210. Both the track roller assemblies 630 and 632 include similar configurations of rollers and/or sliding elements. The track assemblies include a first alignment roller 660 and a second alignment roller 662 each of which are located within the alignment track 655 and which are configured to maintain the belts 618 and 620 in alignment with the guiderails 644. The rollers 660 and 662 rotate about a rotational axis substantially perpendicular to the longitudinal axis of the guiderails. A first rib roller 670 cooperates with the roller 660 and contacts the rib 650 to maintain lateral alignment of the belt and carriage assembly 504. A second rib roller 672 cooperates with roller 662 to maintain lateral alignment of the belt and carriage assembly 504.

In one embodiment, the track assemblies 630 and 632 each further include a first track roller 674 and a second track roller 676. Each of the first and second track rollers 674 and 676 are configured to roll along the third track 658 as the ramp 300 is deployed and stowed. Each of the rollers 676 are operatively connected to a respective one of the first connector 640 and the second connector 642. Each of the rollers 674 are operatively connected to the articulating connector 638. See FIG. 7. As the ramp 300 is deployed from the vehicle, the rollers 674 are directed by the ramp 500 to move to an elevated location when compared to the location of the track 658. As the rollers 674 climb the ramp 500, the articulating connector 638 is raised to the edge 310 of the floor member 202. The rollers 674 and 676 are sufficiently spaced apart such that the roller 676 remains in the track 658 when the ramp 300 is fully deployed. A retaining plate 679 is included as part of the track assembly locates each of the rollers 660, 662, 670, and 672, for movement along the described tracks.

As seen in FIGS. 7, 8 and FIG. 10 rollers 674 are identified as rollers 674A and 674B. As the ramp 300 moves toward the deployed position, roller 674A (see FIG. 10) moves up the ramp 500. At the same time, the roller 674B moves up a similarly configured ramp 500 (not shown) on the opposite side of the ramp 300.

Figure 11:
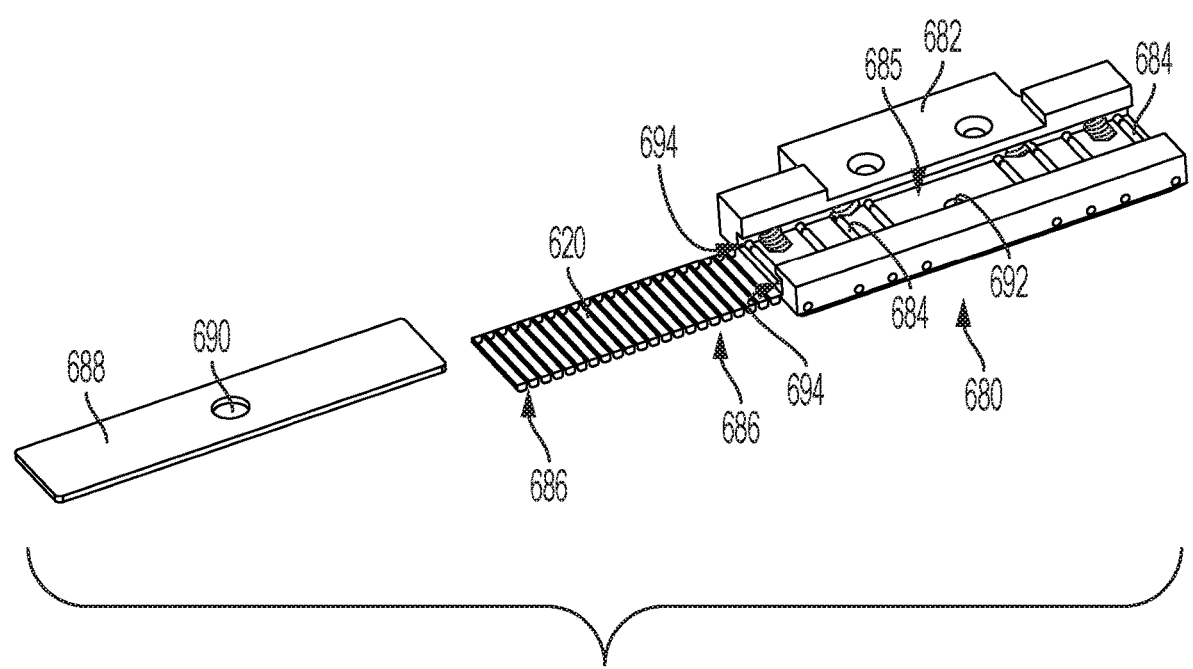
FIG. 11 is an exploded view of a belt retainer block.

FIG. 11 illustrates the belt retainer 680 of the track roller assembly 632 in the same orientation as shown in FIG. 7. A similar belt retainer 680 is provided for the track roller assembly 630. The belt retainer 680 includes a belt retainer block 682 having spaced ridges 684 that are configured to engage slots 686 of the belt 620. The belt 620 is located into a recess 685 of the retainer block 682 and held in place by a belt cap plate 688. Once the belt cap plate 688 is placed in the recess, it is located in place by a fastener to suit (not shown) extending through an aperture 690 of cap plate 688 and an aperture 692 of the retainer block 682. The retainer block defines a channel 694 on either side of the recess 685 to hold the cap plate 688 with a minimum of a gap between the cap plate 688 and the belt in such a manner that the belt ends are effectively retained in a fixed position to transmit the power generated by the drive system to facilitate movement of the ramp system.

In one embodiment, the ramp assembly includes a position tracking assembly having a plurality of position sensors configured to determine the position of the ramp 300 when located at the stowed position and the deployed position. In other embodiments, the position tracking assembly provides for additional locations throughout the ramp's movement. In one embodiment, the tracking assembly includes a first position sensor 700 operatively coupled to the guide rail 644 as illustrated in FIG. 7. A second position sensor (not shown) is located laterally across from the first position sensor 700 and located at similar location in the guide rail 644 supporting the second belt 620. Two additional sensors are located on the guide rails in locations at or near the ramps 500. See sensor 701 in FIG. 8. The tracking assembly also includes a support plate 702 operatively connected to the each of the track assemblies 630 and 632. See FIG. 7 for the location of the support plate 702 at the track assembly 632. A similarly arranged support plate is located at the track assembly 630. The support plates 702 move with movement of the track assemblies 630 and 632 and consequently with movement of the ramp 300.

The support plate 702 includes a first target 704 and a second target 706 spaced from the first target 704. In one embodiment, the sensors 700 are inductive proximity sensors and the first and second targets 704 and 706 are stainless steel connectors which trigger the sensor 700 to transmit a signal to the controller to indicate the location of the ramp 300. In another embodiment, the sensor 700 are Hall-effect sensors and the first and second targets 704 and 706 are magnets or metals having a magnetic field.

Figure 12:
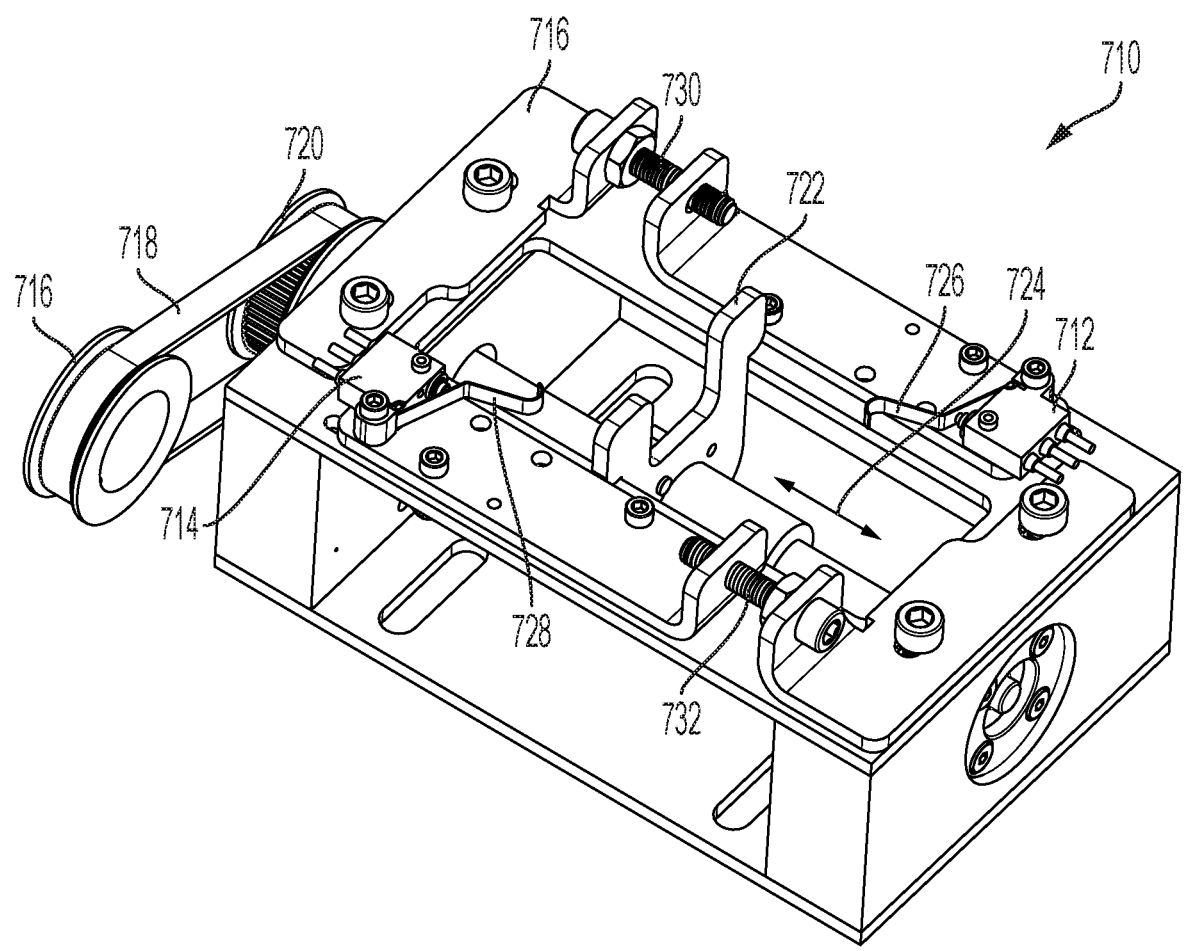
FIG. 12 is a perspective view of a ramp position tracking assembly.

Another embodiment of a position tracking assembly 710 is illustrated in FIG. 12. The position tracking assembly 710 is be in electrical communication with the control system to detect the position of the ramp 300. As shown in FIG. 12, the position tracking assembly 710 includes one or more switches. For example, a first switch 712 and a second switch 714 are coupled to a housing 716. Each switch is be electrically coupled to the controller, and when actuated, the switch detects a position of the ramp 300.

The drive shaft 612, for this embodiment, is fixedly connected to a drive cog 716. As the drive shaft 612 is rotatably driven by the motor 606, the drive cog 716, or other mechanism coupled to the drive shaft 612, is rotated. A belt 718 is operatively connected between the drive cog 716 and driven cog 720. Rotational movement of the of the driven pulley 720, in one embodiment, is converted to linear movement of a position member 722. As the position member 722 moves along a linear path 724, the position member engages one of a first detent member 726 or a second detent member 728. Upon contacting the first detent member 726, the detent member comes into contact with or is detected by the first switch 712. Likewise, upon contacting the second detent member 728, the detent member comes into contact or is detected by the second switch 714. Each switch may detect either the stowed position or the deployed position, and alert the control system of any position the ramp is located in. A pair of adjustment screws 730 and 732 are configured to adjust the position or location of each switch for precise control and analog feedback to the control system.

The overall ramp assembly as shown in FIGS. 2 and 6, in one embodiment, includes dimensions of approximately 3½ inches in height, 36 inches wide, and 92 inches in length. This assembly is thus compacted tightly but yet includes a ramp 300 that is 78 inches long. By placing the drive system 600 towards the rear of the ramp assembly 200, space is further compacted as shown in this disclosure. Even so, the ramp assembly 200 may still be capable of holding over 1000 pounds of weight with a safety factor of 3:1 or greater.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this disclosure pertains and which fall within the limits of the appended claims.

The invention claimed is:

1. A ramp assembly for passengers using a mobility assistance device to enter or exit a motorized vehicle, the ramp assembly comprising:
a rail assembly including a guiderail defining a first track having a first portion extending longitudinally along the rail assembly and a second portion inclined with respect to the first portion;
a ramp operatively connected to the rail assembly that has a first body and a second body that articulates with respect to the first body, wherein the ramp moves along the rail assembly between a storage position and a deployed position;
a first roller operatively connected to the second body and configured to engage the first track; and
a second roller operatively connected to the second body and configured to engage the first track,
wherein the first body and the second body of the ramp are generally coplanar when the ramp is in the storage position and the first body is inclined with respect to the second body when the ramp is in the deployed position, wherein the first roller remains on the first track during movement of the ramp between the storage position and the deployed position, and wherein engagement between the second roller and a guide ramp inclines the first body with respect to the second body when the ramp is in the deployed position.

2. The ramp assembly of claim 1 further comprising a drive belt extending between a first cog and a second cog, wherein the first cog is operatively connected to a drive system, and wherein the drive system drives the first cog to move the drive belt.

3. The ramp assembly of claim 2 further comprising a belt retainer fixedly connected to the drive belt, wherein movement of the drive belt in response to operation of the drive system moves the belt retainer.

4. The ramp assembly of claim 3 wherein the second body of the ramp is rotatably coupled to the belt retainer.

5. The ramp assembly of claim 4 wherein the guiderail defines a second track and the belt retainer includes a first alignment roller configured to engage the second track, wherein the first alignment roller rotates about a first rotation axis substantially aligned with a horizontal plane of the first body.

6. The ramp assembly of claim 5 wherein the belt retainer includes a second alignment roller configured to rotate about a second rotation axis substantially perpendicular to the first rotation axis, wherein the first alignment roller and the second alignment roller cooperate to maintain a lateral position of the drive belt.

7. The ramp assembly of claim 6 further comprising a position sensor operatively connected to one of the guiderail and the belt retainer and a target operatively connected to the other of the guiderail and the belt retainer, wherein movement of the belt retainer adjusts the position of one of the position sensor and the target with respect to the other of the position sensor and the target to determine one of the deployed position and the storage position of the ramp.

8. The ramp assembly of claim 6 wherein the drive system includes a shaft operably connected to the first cog and a motor operably connected to the shaft, wherein the motor is configured to rotate the shaft in a first direction and in a second direction to retract and to deploy the ramp.

9. A motor vehicle having a body, the motor vehicle comprising:
a floor having a floor edge;
a ramp assembly disposed adjacently to the floor, the ramp assembly including a rail assembly including a track having a first portion extending longitudinally along the rail assembly and a second portion inclined with respect to the first portion, a ramp operatively connected to the rail assembly that has a first body and a second body pivotally coupled to the first body by an articulation joint to permit the second body to articulate with respect to the first body, a first roller operatively connected to the second body, and a second roller operatively connected to the second body,
wherein the ramp moves along the rail assembly between a storage position and a deployed position, wherein the first body and the second body of the ramp are generally coplanar when the ramp is in the storage position and the first body is inclined with respect to the second body when the ramp is in the deployed position, and wherein when the ramp is in the deployed position, the articulation joint is raised to the floor edge and aligned with the floor edge.

10. The vehicle of claim 9 wherein the ramp assembly includes a top wall, wherein the top wall is co-planar with the vehicle floor.

11. The vehicle of claim 10 wherein the rail assembly is disposed between the top wall and a bottom wall and includes a guiderail defining a first track configured to engage the first roller and the second roller, wherein the first roller remains on the first track during movement of the ramp between the storage position and the deployed position and the second roller engages a guide ramp to incline the first body with respect to the second body when the ramp is in the deployed position.

12. The vehicle of claim 11 wherein the ramp assembly includes a drive belt extending between a first cog and a second cog, wherein the first cog is operatively connected to a drive system, wherein the drive system drives the first cog to move the drive belt.

13. The vehicle of claim 12 further comprising a belt retainer fixedly connected to the drive belt, wherein movement of the drive belt in response to operation of the drive system moves the belt retainer.

14. The vehicle of claim 13 wherein the second body of the ramp is rotatably coupled to the belt retainer.

15. The vehicle of claim 14 wherein the guiderail defines a second track and the belt retainer includes a first alignment roller configured to engage the second track, wherein the first alignment roller rotates about a first rotation axis substantially aligned with a horizontal plane of the first body.

16. The vehicle of claim 15 wherein the belt retainer includes a second alignment roller configured to rotate about a second rotation axis substantially perpendicular to the first rotation axis, wherein the first alignment roller and the second alignment roller cooperate to maintain a lateral position of the drive belt.

17. The vehicle of claim 16 further comprising a position sensor operatively connected to one of the guiderail and the belt retainer and a target operatively connected to the other of the guiderail and the belt retainer, wherein movement of the belt retainer adjusts the position of one of the position sensor and the target with respect to the other of the position sensor and the target to determine one of the deployed position and the storage position of the ramp.

18. A method of extending and retracting a wheelchair ramp from a vehicle, the vehicle including a floor member configured to support a passenger in a wheelchair, the method comprising:
providing a ramp operatively connected to a rail assembly, the ramp having a first body and a second body pivotally coupled to the first body by an articulation joint to permit the second body to articulate with respect to the first body; and
moving the ramp along the rail assembly from a storage position to a deployed position in which the first body is inclined with respect to the second body and the articulation joint is raised to a floor edge of the floor member and aligned with the floor edge, wherein moving the ramp along the rail assembly from the storage position to the deployed position includes moving the first body along a first track and a second track inclined with respect to the first track and moving the second body along the first track.

19. The method of claim 18 further comprising moving a first roller of the first body along the first track and the second track and moving a second roller of the second body along only the first track to move the ramp to the deployed position.

* * * * *